(12) United States Patent  (10) Patent No.: US 9,188,301 B2
Schneider  (45) Date of Patent: Nov. 17, 2015

(54) VEHICLE HEADLAMP

(71) Applicant: GM GLOBAL TECHNOLOGY OPERATIONS LLC, Detroit, MI (US)

(72) Inventor: Ingolf Schneider, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 14/261,222

(22) Filed: Apr. 24, 2014

(65) Prior Publication Data

US 2014/0321146 A1  Oct. 30, 2014

(30) Foreign Application Priority Data

Apr. 24, 2013  (DE) .......................... 10 2013 007 155

(51) Int. Cl.
*B60Q 1/00* (2006.01)
*F21S 8/10* (2006.01)

(52) U.S. Cl.
CPC ........... *F21S 48/145* (2013.01); *F21S 48/1208* (2013.01); *F21S 48/1721* (2013.01); *F21S 48/31* (2013.01); *F21S 48/328* (2013.01)

(58) Field of Classification Search
CPC . F21S 48/1208; F21S 48/145; F21S 48/1721; F21S 48/31; F21S 48/32; F21S 48/328
USPC .......................... 362/507, 509, 512, 520, 547
See application file for complete search history.

(56) References Cited

U.S. PATENT DOCUMENTS

2012/0063156 A1  3/2012  Yasuda et al.

FOREIGN PATENT DOCUMENTS

| DE | 10258623 A1 | 7/2004 |
|---|---|---|
| DE | 10319363 A1 | 11/2004 |
| DE | 10331835 A1 | 2/2005 |
| DE | 102007016439 A1 | 10/2008 |
| DE | 102007016441 A1 | 10/2008 |
| DE | 102007062388 A1 | 6/2009 |
| WO | 2004055433 A1 | 7/2004 |

OTHER PUBLICATIONS

Search Report dated Oct. 23, 2014 for GB 1405213.8.

*Primary Examiner* — Jason Moon Han
(74) *Attorney, Agent, or Firm* — Ingrassia Fisher & Lorenz PC

(57) ABSTRACT

A headlamp of a vehicle is disclosed having an optical system arranged after a light source in a path of a light beam emitted by the light source. The light beam has a directed main beam and a component of undirected diffused light. A cover screen is arranged parallel to the directed main beam after the optical system. A plate for discharging heat is arranged after the cover screen. A lens cover in combination with the cover screen forms an in travelling direction front cover of the headlamp. The cover screen has an aperture which opens the space between the optical system and the cover screen in the direction of the plate and the optical system includes an optical lens body and the undirected diffused light of the light source substantially radiates through the aperture in the cover screen onto the plate.

15 Claims, 2 Drawing Sheets

VEHICLE HEADLAMP

CROSS REFERENCE TO RELATED APPLICATION

This application claims priority to German Patent Application No. 10 2013 007155.0, filed Apr. 24, 2013, which is incorporated herein by reference in its entirety.

TECHNICAL FIELD

The technical field relates to a headlamp for a vehicle, and more particularly to a headlamp which produces having a direct light source, an optical system, a cover screen with an aperture, a plate for discharging heat and a lens cover, wherein undirected diffused light of the light beam of the light source radiates onto the plate through the aperture in the cover screen.

BACKGROUND

From DE 102 58 623 A1 a headlamp unit for a motor vehicle is known, having a housing which is formed for fastening to a body of the vehicle, in which at least one light source is arranged and on which a glass is attached, through which the light generated by the at least one light source exits the housing. In order to avoid an undesirable temperature increase in the housing, it is proposed to configure the housing insulated and/or to connect at least one light source designed as LED with at least one heat conducting element in a heat-transferring manner.

An object on which the present disclosure is based consists in making available a headlamp with a cover screen for a vehicle, in which the cover screen is protected from damage through heat. A further object is providing a motor vehicle with two corresponding headlamps.

SUMMARY

An aspect of the present disclosure relates to a headlamp assembly of a vehicle having a light source and a holder for the light source. An optical system is arranged after the light source in a path of the light beam emitted by the light source. The light beam includes a directed main beam and a component of undirected diffused light. A cover screen is arranged after the optical system parallel to the directed main beam of the light source. A plate of heat-conductive material is arranged between the cover screen and a housing such that the cover screen separates the optical system from the plate which is behind the cover screen. The cover screen has an aperture which opens the space between the optical system and the cover screen in the direction of the plate. The optical system includes an optical lens body and the undirected diffused light of the light source radiates through the aperture in the cover screen onto the plate. The fact that the plate is arranged behind the cover screen signifies that the cover screen at least partially covers the plate or the plate at least partially covers the cover screen. Here, the plate is preferably arranged in travelling direction of the motor vehicle in front of the cover screen.

The optical lens body can be at least a part of an ellipsoid module. The ellipsoid module can have a basic body, from which an elliptical optical lens protrudes in light beam direction. The basic body can be prepared in order to fasten the optical lens on or in the headlamp or to connect it for example to an adjuster. The elliptical optical lens in this case can be formed so that it can be connected to the basic body or be formed in one piece with the basic body. The connecting line of the optical lens with the basic body is elliptical. The optical lens can be curved from the connecting light in light beam direction. The curvature in a section can have the shape of a part-ellipse parallel to the light beam direction, e.g. the shape of an end portion of an American football.

The aperture in the cover screen can be introduced in a region of a maximum radiation intensity of the undirected diffused light. This region can be located where the light beams of the undirected diffused light almost perpendicularly impinge on the cover screen, since in this region the specific ray density can be greatest. The greater an angle of incidence of the undirected rays of the diffused light on the top side of the cover screen facing the lens body, the greater is also an irradiation angle, as a result of which no or at least little "radiation congestion" occurs in this region which leads to a lower heating of the cover screen through the light irradiation of the diffused light.

Providing an opening in the cover screen at the critical region will minimize or eliminate melting or initial melting or early material ageing of the cover screen through the radiation heat of the light source. In addition, additional heat supply through the solar rays from sunshine can be prevented.

A size of the plate can substantially correspond to a size of the cover screen. In order to define the size, the plate has a top side and a bottom side, with a finite length and a finite width. Now, the size of the plate is for example a projection surface of the plate onto a plane substantially running parallel to the plate top side. The same applies to the size of the cover screen. Since the cover screen can be a three-dimensional body, the plate can also be designed three dimensionally and substantially follow a shape of the cover plate at least in regions thereof such that the term "plate" is not intended to be limited to a generally flat planar structure.

The cover screen and the plate can be arranged at a clear spacing relative to one another, or the cover screen can contact the plate without being mechanically connected to the latter. Alternatively, the plate can be connected or is connected to the cover screen. The connection can for example be achieved through a non-positive and/or positive connection between the cover screen and the plate, for example through a heat-resistant adhesive, riveting or screw connections or through engagement and counter-engagement elements, which engage into one another.

The plate can have a construction which permits a heat transfer substantially only in one direction through the plate. The plate can consist for example of a heat-conductive body, which on a top side is flat and a lower side has a for example saw tooth-like structure. The teeth have a flattened tooth tip and a tooth base. The regions between the teeth from the tooth base to the tooth tip are filled up with a heat-insulating material, e.g. a ceramic, wherein the flattened tooth tips are level with a surface of the ceramic material. If the plate is now arranged so that the surface of the heat-conductive plate body faces the cover screen, heat can be directed away from the cover screen while heating of the cover screen through the plate is at least restricted.

On the top side and/or bottom side the plate can have at least in regions a surface-enlarging structure in order to increase heat absorption and/or heat discharge capacity of the plate compared with a flat plate. Because of this, the bottom side of the plate, i.e. the side of the plate facing away from the screen can have a larger surface for heat discharge than the side facing the screen, so that because of this a heat flow away from the screen through the plate is favored.

The optical lens body is prepared in order to be connected to an actuating drive. If the optical lens body is part of an ellipsoid module, the basic body of the module is prepared in order to connect the optical lens body to the actuating drive.

Through the actuating drive, a position of the optical lens relative to the light beam emanating from the light source can be adjusted such that the light beam through the optical lens body is deflected at an angle which can be predetermined through a degree of the adjustment of the optical lens body. Because of this, the light can be optionally output for example as curve light.

The aperture can be so positioned and so dimensioned in the cover screen so that, independent of the position of the optical system, the diffused light can radiate through the aperture onto the plate substantially in any position of the optical system. Alternatively, the cover screen can likewise include an actuating drive and be adjusted independently of or together with the optical system so that it is ensured that the diffused light radiates through the aperture onto the plate.

The actuating drives for the optical system and the cover screen and possibly the plate can be separate actuating drives, which operate independently of one another or of which two or all three are, for example, mechanically coupled or can be coupled to one another. It can also be a common actuating drive for the optical system and the cover screen and possibly the plate.

The light source can be a known cold light source, an incandescent light bulb, a xenon light, a halogen light or one or multiple LEDs. The light source may also include a reflector positioned behind the light source along the path of the light beam.

The headlamp assembly disclosed herein can be used as a front headlamp or as a pair of front headlamps of a motor vehicle. Accordingly, the expression "a" used in the entire description and the claims is utilized as an indefinite article and the quantity of parts is not restricted to a single one.

The heat transferred to the plate can be utilized in order to heat the lens cover of the headlamp and via the lens cover, which during driving is continuously cooled through the headwind, be given off to the environment. At the same time, the heating of the lens cover prevents condensation forming within the headlamp and/or dries parts on which condensate has already formed so that the use of anti-condensate paint, a breathable fabric membrane such as Gore-Tex® or other condensation preventing or diminishing means can be largely omitted.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
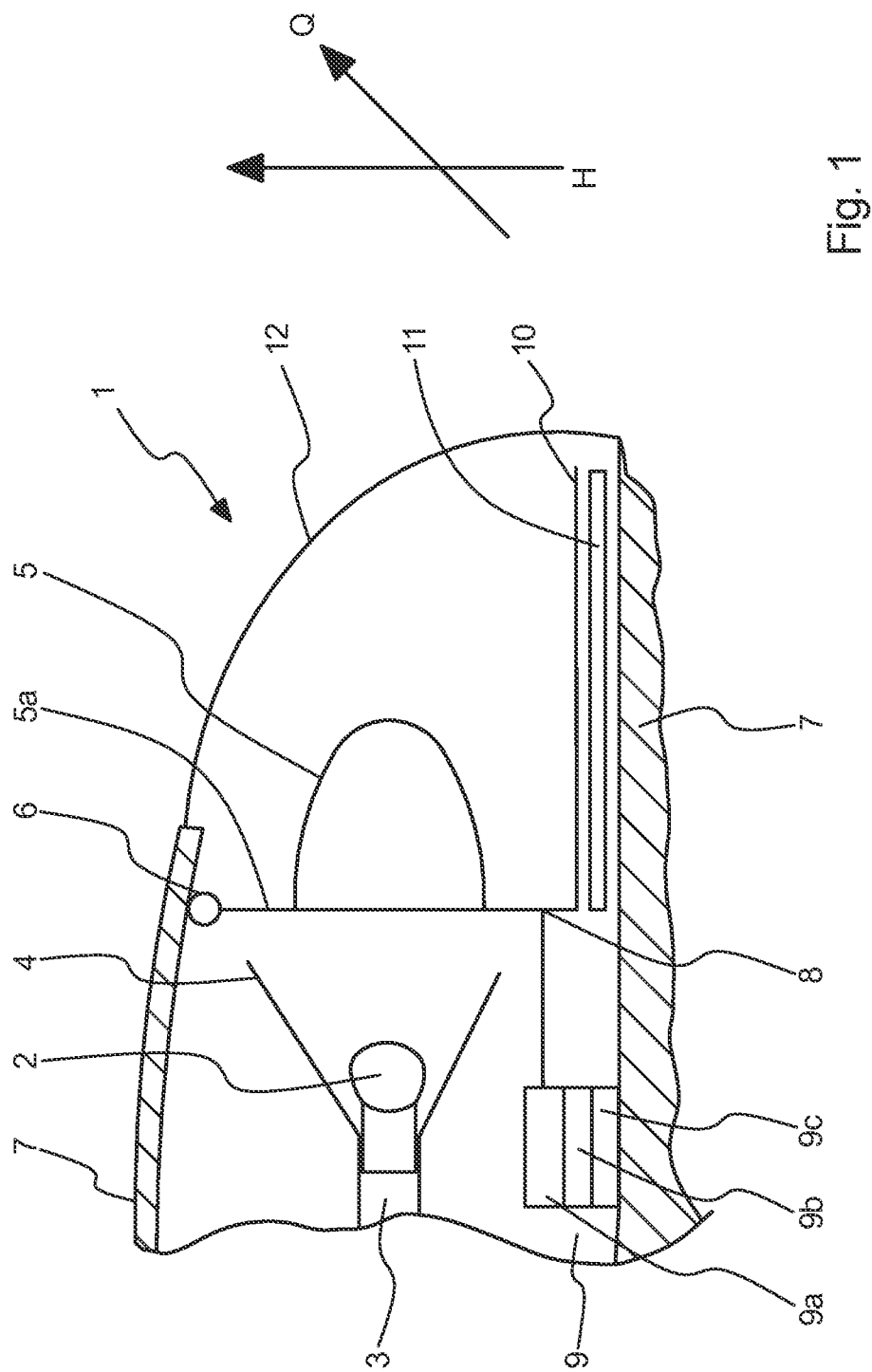
FIG. 1 illustrates a schematic cross-section through a vehicle headlamp.

In the figures, components which are the same or have the same functional effect are provided with the same reference numbers. FIG. 1 shows a basic construction of a headlamp assembly 1 according to an aspect of the present disclosure.

The headlamp assembly 1 includes a light source 2, a mount or holder 3 for the light source 2 and a funnel-shaped reflector 4, which is connected to the holder 3 or is formed in one piece with the holder 3. Alternatively, the reflector may be fastened in the headlamp assembly 1 independently on the holder 3.

In front of the reflector 4 a lens body 5 is arranged, which in the exemplary embodiment has an elliptical shape and is connected to a base 5a or may be formed in one piece therewith. The base 5a is connected to a body or housing 7 by a pan and tilt bearing 6 so that the lens body 5 and base 5a can be panned about a vertical axis H and tilted about a transverse axis Q.

The base 5a is connected to an adjuster 9 at a connecting point 8. The adjuster 9 includes a base 9c on which a second adjusting mechanism 9b is mounted for rotating the base 5a about the vertical axis H. With the second adjusting mechanism 9b, an adjusting mechanism 9a is connected and linearly movable along a longitudinal axis in and against a travelling direction of the vehicle for tilting the base 5a about the transverse axis Q. The first adjusting mechanism 9a and the second adjusting mechanism 9b can be operated independently of one another or jointly operated at the same time.

In front of the base 5a and below the lens body 5 is provided a shade or cover screen 10, and below the cover screen 10 a plate 11 is arranged. The cover screen 10 can for example be a designer screen. The headlamp assembly 1 furthermore includes a lens cover 12, which is connected to the body 7 and seals the headlamp assembly 1 against the environment.

Figure 2:
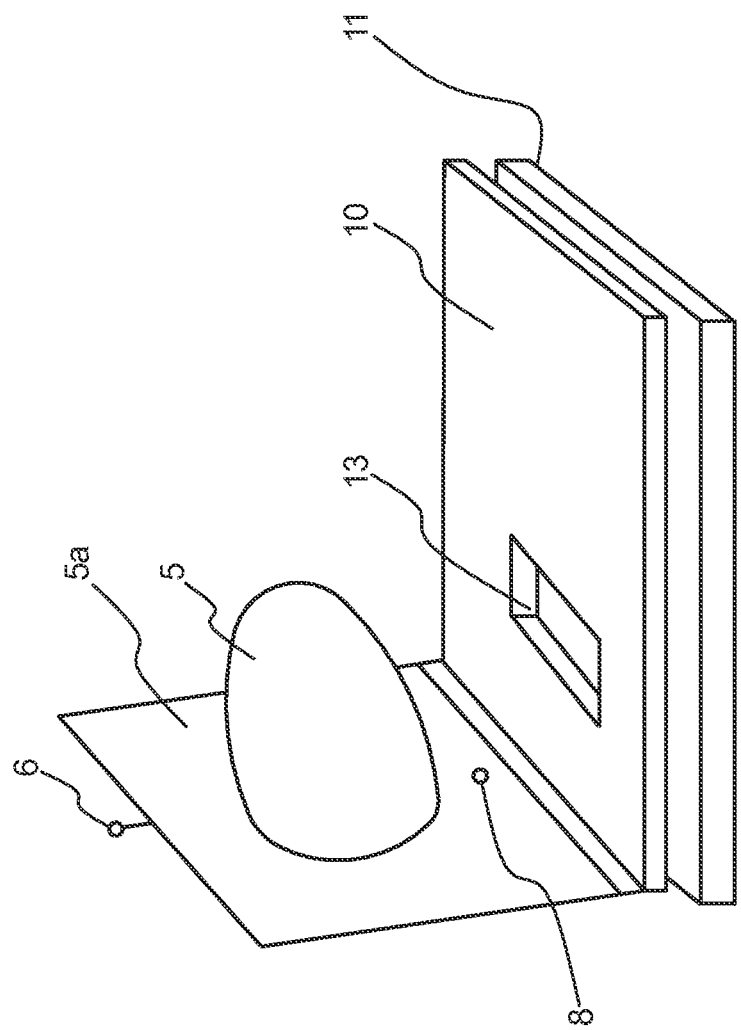
FIG. 2 is a schematic illustration of an ellipsoid module with a cover screen and a plate.

FIG. 2 depicts a perspective view of the combination of the lens body 5 and the base 5a with the cover screen 10 and the plate 11. The combined pan and tilt bearing 6 is connected to the base 5a. The base 5 furthermore includes a connecting point 8 in which it can be connected to the adjusting mechanism 9 which is not shown in FIG. 2. The screen 10 has an aperture 13. The aperture 13 is formed in the cover screen 10 in a region in which undirected rays of a diffused radiation emanating from the lens body 5 substantially impinge at least in part perpendicularly onto the cover screen in any of the positions which are optionally adjustable by means of the adjusting mechanism 9.

In order to prevent melting of the cover screen 10 in this region, the undirected rays of the diffused radiation are directed through the aperture 13 onto a plate 11. The plate 11 is a heat transfer element for discharging the heat and directs the heat away from the cover screen, and then for example onto the lens cover 12. Since the lens cover 12 while driving is continuously subjected to the circulating flow from the headwind, the lens cover 12 can be utilized in order to discharge the heat from the headlamp assembly 1 into the environment. The heating of the lens cover 12 additionally prevents a formation of condensate on the lens cover 12 or throughout the headlamp assembly 1 or dries the lens cover 12 or other parts of the headlamp assembly 1, when condensate has already formed.

Although in the preceding description exemplary embodiments of the subject matter have been disclosed, it is to be understood that numerous further versions of embodiments exist through combination possibilities of all mentioned technical features and embodiments, and furthermore all technical features and embodiments which are obvious to the person skilled in the art. It is to be understood furthermore that the exemplary embodiments are examples which do not restrict the scope of protection, the applicability or the configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A headlamp assembly for a vehicle comprising:
    a light source for emitting a light beam;
    an optical system having an optical lens assembly arranged after the light source in a path of the light beam for producing a directed main beam along the path and a component of diffused light;
    a cover screen disposed parallel to the directed main beam and having an aperture formed therethrough;
    a heat transfer element having a plate disposed behind the cover scree relative to the optical system; and
    a lens cover forming a front cover for the optical system;
    wherein the component of diffused light substantially radiates through the aperture in the cover screen onto the plate for heat transfer to the lens cover.

2. The headlamp assembly according to claim 1, wherein the optical lens body is at least a part of an ellipsoid module.

3. The headlamp assembly according to claim 1, wherein the component of diffused light has a region of maximum radiation intensity at the cover scree, and wherein the cover screen is positioned so that the aperture is located at the region of maximum radiation intensity.

4. The headlamp assembly according to claim 1, wherein a size of the plate substantially corresponds to a size of the cover screen.

5. The headlamp assembly according to claim 1, wherein the cover screen and the plate are arranged in a spaced relation relative to one another.

6. The headlamp assembly according to claim 1, wherein the cover plate is supported by the plate.

7. The headlamp assembly according to claim 1, wherein the cover screen is connected to the plate in a fixed manner.

8. The headlamp assembly according to claim 1, wherein the plate comprises a surface enlarging structure formed on a top surface thereof for increase a heat absorption capacity of the plate.

9. The headlamp assembly according to claim 1, wherein the plate comprises a surface enlarging structure formed on a bottom surface thereof for increasing a heat discharge capacity of the plate.

10. The headlamp assembly according to claim 1, wherein the optical lens assembly comprises a lens base supporting a lens body.

11. The headlamp assembly according to claim 10, further comprising an adjuster coupled to the lens base, wherein the lens base is movable with respect to the light source for selectively positioning the optical lens assembly.

12. The headlamp assembly according to claim 1, wherein the light source is selected from the group consisting of an LED, a multiple LED array, an incandescent lamp, a xenon lamp or a halogen lamp.

13. The headlamp assembly according to claim 12, further comprising a reflector arranged before the light source along the path of the light beam.

14. A motor vehicle having two front headlamps, each of the two front headlamps comprising a headlamp assembly according to claim 1.

15. A motor vehicle having a front headlamp comprising:
    a light source for emitting a light beam;
    an optical system having an optical lens body arranged after the light source in a path of the light beam for producing a directed main beam along the path and a component of diffused light;
    a cover screen disposed parallel to the directed main beam and having an aperture formed therethrough;
    a heat transfer element having a plate disposed behind the cover scree relative to the optical system; and
    a lens cover forming a front cover for the optical system;
    wherein the component of diffused light substantially radiates through the aperture in the cover screen onto the plate for heat transfer to an environment around the motor vehicle.

* * * * *